United States Patent [19]
Maelzer et al.

[11] 4,200,454
[45] Apr. 29, 1980

[54] PROCESS FOR THE VOLATILIZATION OF ZINC AND/OR LEAD FROM METALLURGICAL MATERIAL

[75] Inventors: Carl-August Maelzer, Prien, Chiemsee; Martin Rahn, Frankfurt am Main; Lothar Reh, Bergen-Enkheim; Bernd Thöne, Friedberg; Karel Vydra, Bad Nauheim, all of Fed. Rep. of Germany; David Rice, R. D. I. Industry, Pa.

[73] Assignees: Metallgesellschaft AG, Frankfurt am Main, Fed. Rep. of Germany; St. Joe Minerals Corporation, New York, N.Y.

[21] Appl. No.: 892,259

[22] Filed: Mar. 31, 1978

[30] Foreign Application Priority Data

Apr. 12, 1977 [DE] Fed. Rep. of Germany ....... 2716084

[51] Int. Cl.² .................. C22B 19/20; C22B 19/04
[52] U.S. Cl. ......................... 75/88; 75/86; 75/87
[58] Field of Search ........................ 75/86–88

[56] References Cited

U.S. PATENT DOCUMENTS

4,132,764  1/1979  Cines .......................... 75/86

FOREIGN PATENT DOCUMENTS

688252  3/1953  United Kingdom ................ 75/86
971729  10/1964  United Kingdom ............... 75/86

*Primary Examiner*—P. D. Rosenberg
*Attorney, Agent, or Firm*—Karl F. Ross

[57] ABSTRACT

Zinc and, if desired, lead are volatilized from a metallurgical material such as a finely divided oxidic ore, ore concentrate or another metallurgical intermediate. The volatilization of the zinc is carried out at a temperature above 1300° C. in a cyclone chamber which has an axis that is substantially horizontal, i.e. is inclined to the horizontal at an angle of 0° to 15°. Carbon dioxide is removed from the gas leaving the zinc condensing stage and the high carbon monoxide gas thus obtained is recycled to the cyclone chamber or at another point ahead of the condensation stage.

19 Claims, 1 Drawing Figure

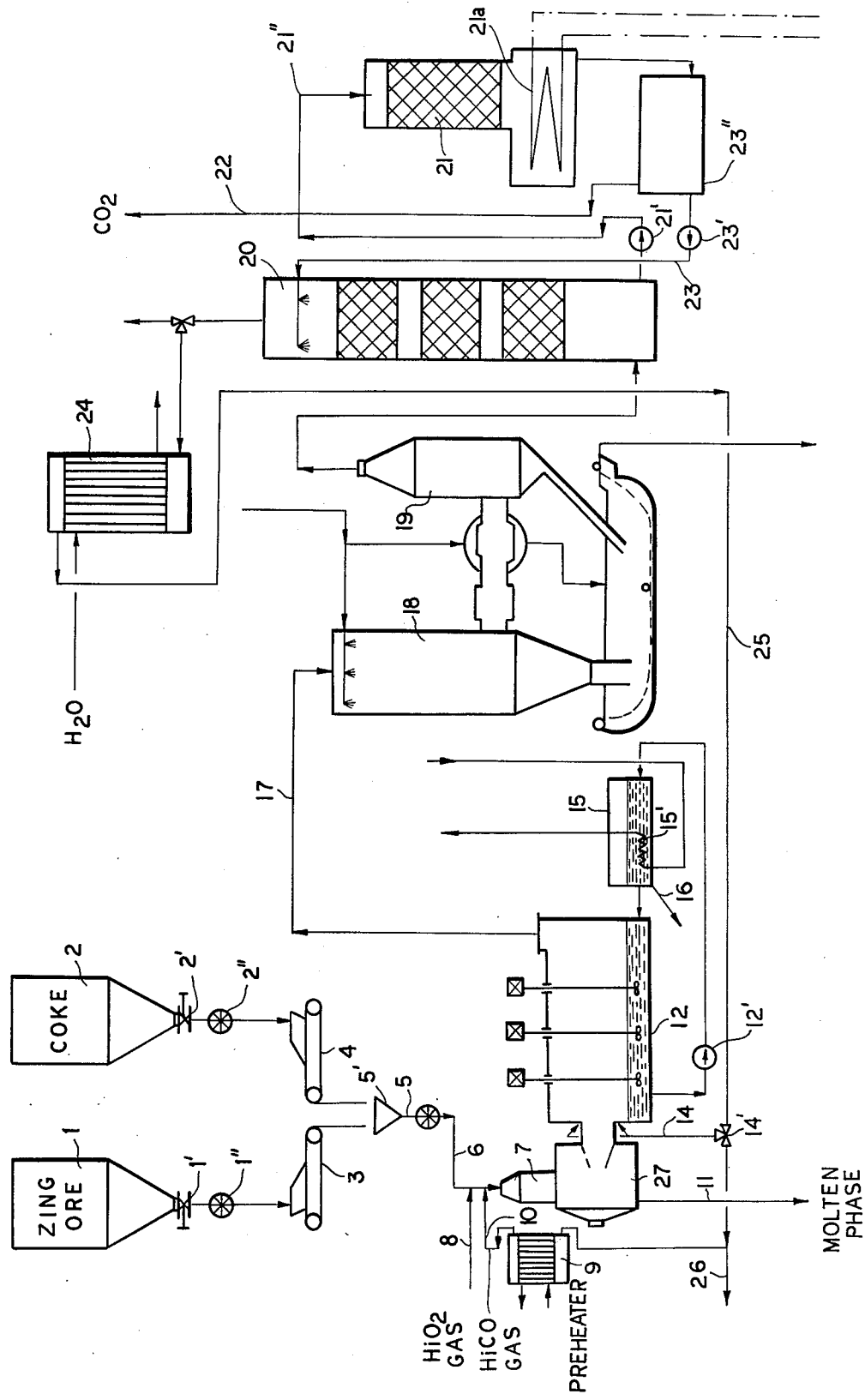

PROCESS FOR THE VOLATILIZATION OF ZINC AND/OR LEAD FROM METALLURGICAL MATERIAL

CROSS REFERENCE TO RELATED APPLICATION

This application is related to and covers the same subject matter as Ser. No. 823,857 filed Aug. 11, 1977 (previously allowed, now abandoned) and has been filed to add an inventor inadvertently omitted in this parent application.

FIELD OF THE INVENTION

The present invention relates to a process for the volatilization of zinc and/or lead from metallurgical material in finely divided form. It also relates to a method of operating a plant for the recovery of zinc and/or lead and to an improved plant for the purposes described. More particularly, the invention deals with the use of a cyclone chamber for the volatilization of zinc in finely divided oxidic ores, ore concentrates and other metallurgical intermediates using a high-oxygen gas and carried out at a temperature above the volatilization point of zinc.

BACKGROUND OF THE INVENTION

It is known to provide shaft furnaces for the reduction of zinc-containing ores or other metallurgical products containing zinc oxide, and to recover the zinc as zinc vapor which can be condensed from the gases emerging from the shaft furnace. The condenser can be supplied with molten lead at a temperature of about 500° C. These systems are described, for example, in German Pat. Nos. 823,937; 824,259; 941,391; 943,726; and 965,954.

It has also been proposed to carry out the recovery of zinc by reduction and evaporation in a refractory-lined vertical cyclone. A slag chamber (British Pat. No. 971,729) is disposed under the vertical cyclone to collect the molten product which runs down along the cyclone wall. The gas conduit of the cyclone is connected to a condenser in which the zinc vapors are condensed.

One of the primary disadvantages of the use of the shaft furnace for the reduction of the oxidic zinc metallurgical solids is that the throughput of the latter is low per unit volume of the reactor. Furthermore, it has been found to be disadvantageous with respect to parameter control in that, for example, it is difficult to adjust and maintain a given gas atmosphere in the shaft furnace.

A shaft furnace requires that the solids bed have a uniform and high permeability for effective solid/gas contact and, to this end, the reducing agent is usually the coarse-grain coke which must be used in a relatively narrow particle size range. This requires pretreatment of the reducing agent and introduces another concern in the operation of a shaft furnace.

Finally, when zinc is volatilized in the shaft furnace, it is usually necessary to after-burn the exhaust gases to raise the exhaust gas temperature to a level which is sufficient to limit reoxidation of the metallic zinc. Reference may be had, in this connection, to the aforementioned German Pat. No. 941,391.

Prior-art systems for the recovery of zinc by a technique which involves a volatilization and condensation of the zinc all have the disadvantage that the latent energy content of the exhaust gas is not usually returned to the process. Moreover, the high temperatures of the exhaust gases of cyclone processes tend to result in difficulties in the operation of the condenser.

OBJECTS OF THE INVENTION

It is the principal object of the present invention to provide an improved process for the volatilization of zinc from metallurgical materials and especially for the reduction of oxidic zinc compositions with volatilization and condensation of zinc, which is free from the disadvantages of earlier processes as described previously and hence is more economical, more readily controlled and capable of a higher throughput per unit of reactor volume than earlier processes.

Another object of this invention is to provide an improved method of operating a plant for the recovery of zinc with greater economy and high throughput.

Yet a further object of this invention is to provide an improved plant for the recovery of zinc and/or lead from metallurgical products such as zinc-containing ores, ore concentrates and like metallurgical intermediates.

Yet a further object of the invention is to provide a process for the purposes described which is free from the disadvantages enumerated above and affords better utilization of energy.

SUMMARY OF THE INVENTION

These objects and others which will become apparent hereinafter are attained, in accordance with the present invention, in a process for the treatment of zinc-containing metallurgical materials with a gas stream capable of reaction therewith to produce elemental zinc whereby the reaction is effected at least in part in a cyclone chamber having a substantially horizontal axis at a temperature above 1300° C.

An essential feature of the invention resides in removing carbon dioxide from the exhaust gas of a condensation stage downstream of the cyclone chamber to which the exhaust gases are fed, the resulting gas, having a high carbon monoxide content, being at least parly recycled to a point upstream of the condenser and/or to the cyclone chamber.

The invention makes use of a cyclone chamber having a substantially horizontal axis and, when reference is made herein to "substantially horizontal" it is intended thereby to refer to an orientation of the cyclone axis which is precisely horizontal or is inclined to the horizontal by an angle of up to 15°. The cyclone chamber axis, in general terms, can be inclined to the horizontal from 0° to 15°. The carbon-dioxide-free gas, rich in carbon monoxide, is supplied to the cyclone chamber and/or to another point in the flow path which precedes the condensing stage.

The gas which is reacted with the metallurgical materials is a "high-oxygen" gas, namely, a gas which contains at least 30% by volume oxygen. Such gases can be prepared by mixing air and high-concentration oxygen. The oxygen and air may be fed to the cycled chamber separately or may be mixed together before being introduced into the cyclone chamber.

We have found that the geometric specific surface area of the particle of the charge, i.e. the metallurgical materials and any reducing agent or fluxing agent which may be used, is important and that the specific geometric surface area should be between 10 and 100 $m^2/kg$, preferably 40 to 300 $m^2/kg$. This specific surface area corresponds to a median particle diameter of 3 to 300 microns, preferably 10 to 80 microns. The median particle diameter is defined as the particle diameter above and below which each fraction consists of 50% by weight of the solids.

When the reducing agent is a solid which is introduced with the charge, it may consist of powdered coal. Otherwise the carbonaceous reducing agent may be any solid, liquid or gaseous fuel and can, for example, be carbon monoxide gas. The cyclone chamber, in accordance with the present invention, may be water-jacketed, i.e. may have walls which are cooled by heat transfer to water. Advantageously, cooling is effected by evaporation of water under a pressure of at least 10 atmospheres.

Best results are obtained when the oxygen content of the high-oxygen gases introduced into the cyclone chamber is 40 to 80% by volume. The charge of solids and the carbonaceous material is preferably introduced into the cyclone chamber along secants. It is has been found to be advantageous to provide the cyclone wall as a steam-cooled studded wall with a tamped refractory lining. In this case, a thin layer of the molten material formed by the reaction is caused to deposit upon the wall and solidify in contact therewith to protect the lining. The temperature in the cyclone chamber is preferably maintained above 1450° C.

One of the important advantages of the system of the present invention is that is allows virtually complete separation of the molten slag in the cyclone chamber. Specifically, it is possible to separate out in excess of 85% of the slag and to discharge the slag into a hearth through an opening provided in the shell of the cyclone chamber for further processing, e.g. granulation and/or separation of valuable substances if contained in the molten material.

The zinc and any lead which is contained in the gas stream from the cyclone chamber may be condensed with the recycled high carbon monoxide gas directly. This is a result of a cooling of the gas to about 700° C.

Preferably, condensation is carried out by scrubbing the gas with a spray or curtain of molten lead and/or zinc at a temperature of about 500° C. As a result, the metals originally in the vapor phase are virtually completely recovered by dissolution in the molten metal. The latter can then be cooled to separate a metallic zinc phase which can be separately recovered. Surplus zinc can also be removed by passage through a pressure lock or gate, e.g. over a wier.

After the condensation step, the gas stream is subjected, according to an essential feature of the invention, to carbon dioxide removal, preferably by sharply cooling the gas and/or the application of pressure. In a particularly advantageous embodiment of the invention, the gas is scrubbed with an absorbent for carbon dioxide. A particularly preferred class of extracting solutions for this purpose are the lower-alkylolamines, especially monoethanolamine, and potassium hydroxide solution. The scrubbing solution can be regenerated for renewed absorption of carbon dioxide, the regeneration being effected by any means known in the art. Typical regeneration steps include heating of the monoethanolamine and the potassium hydroxide solution, the latter preferably being expanded before being heated.

After the removal of carbon dioxide, the gas stream, having a high carbon monoxide content, is recycled at least in part either to the cyclone chamber or to a point upstream of the condensation stage, or both.

If the gas is scrubbed to remove the carbon dioxide, we prefer to remove water vapor from the gas, e.g. by scrubbing the same with sulfuric acid.

Recycling of the high carbon monoxide gas to the cyclone chamber permits conservation of a substantial part of the carbonaceous material supplied to the system and thus enables better utilization of the calorific value of the gas stream. This is significant because the gas stream has a high calorific value in view of its relatively low carbon dioxide content and its relatively high carbon monoxide content. The energy content of the gases can be increased by preheating the latter in indirect heat exchange according to a preferred embodiment of the invention.

The gas required for indirect preheating may be generated by the combustion of a portion of the high carbon monoxide gas which can be in surplus.

According to still another aspect of the invention, the gas which is substantially free from carbon dioxide and has a high carbon monoxide content is introduced into the hot gas stream from the cyclone chamber immediately before the hot gas stream enters the condenser. A preferred temperature drop to about 800° C. results in a substantial suppression of any tendency toward reoxidation of the zinc vapor to zinc oxide. As a result, the formation of a zinc oxide dross is substantially precluded. The suppression of reoxidation is asserted by the decrease of the partial pressures of zinc vapor and carbon dioxide resulting from the recycling of gas and hence dilution of the gas entering the condenser.

According to yet a further feature of the invention the solid charge, the high oxygen gas and the carbonaceous material are mixed at a temperature below the reaction temperature to form a suspension which is fed to a combustion path ahead of the cyclone chamber at a velocity which precludes backfiring.

As described in U.S. Pat. No. 3,915,692, this combustion path can lie substantially at right angles to the axis of the cyclone chamber and can extend vertically downwardly when the cyclone has a substantially horizontal axis.

The suspension is caused to react along the combustion path so that the suspension, as it enters the cyclone chamber consists predominantly of molten particles, i.e. droplets. It has been found that best results are obtained when the residence time in the combustion chamber or along the combustion path is such that at least 80% of the reaction is completed before the suspension leaves the combustion path and enters the cyclone chamber.

Various measures can be taken, in accordance with the present invention, to supply the suspension to the combustion path at a velocity which precludes back-firing. The reactants may be mixed so that the suspension itself has a sufficiently high velocity. It is possible to introduce one or more components of the suspension through a nozzle-like constriction in which the suspension velocity is accelerated to prevent back-firing. Advantageously, as described in U.S. Pat. No. 3,915,692, a charging device can be provided ahead of the constriction.

One of the advantages of this arrangement is that streaks and agglomerations in the suspension, as well as dead spots, are eliminated. The suspension is completely homogenized so that the surface area of the particles can be fully utilized for the reaction, i.e. there are no solid surfaces which cannot be exposed to the solid/gas reaction. The gas velocity in the combustion path, calculated for the empty tube can be 8 to 30 meters/second.

The process of the present invention has been found to be applicable to the treatment of zinc-containing materials of practically any composition and nature, whether the materials contain lead or do not contain lead. The materials are usually zinc-containing ores, ore concentrates and other metallurgical intermediates and, if they have low lead contents, the lead is quantitatively evaporated together with the zinc.

If the lead content is relatively high, e.g. approaching the zinc content or higher than the zinc content, only a relatively small amount of the lead is volatilized. Most of the lead is recovered with the liquid phase from the cyclone chamber and is supplied to the hearth for separation of slag.

BRIEF DESCRIPTION OF THE DRAWING

The above and other objects, features and advantages of the present invention will become more readily apparent from the following description, reference being made to the accompanying drawing the sole FIGURE of which is a flow diagram of a plant for carrying out the process of the present invention.

SPECIFIC DESCRIPTION

The plant shown in the drawing comprises a supply bin 1 for zinc ore and a supply bin 2 for coke, each of the supply bins having a controlled outlet 1', 2' and communicating via a metering gate 1", 2" with a respective weighing belt conveyor 3, 4. The belt converges discharge into a common hopper 5' of a mixture 5 in which the solids are blended and then delivered by line 6 to the elongated combustion chamber 7, preferably bring pneumatically conveyed thereto by a high-oxygen gas delivered by line 8 and recycled high carbon monoxide gas delivered by line 10.

The combustion chamber 7 can be of the type described in U.S. Pat. No. 3,915,692.

The high-carbon monoxide gas is previously passed through a preheater 9. Hence the entire charge, both gaseous and solid, is thoroughly mixed before it enters the combustion chamber 7.

The combustion chamber opens into a cyclone chamber 27 (U.S. Pat. No. 3,915,692) from which the molten phase is discharged through a tap in the wall of the cyclone chamber as represented at 11. The molten phase can be delivered to a hearth for separation of slag.

The gaseous phase, entraining condensable lead and zinc, enters a condenser 12 which is supplied with molten lead serving as the cooling medium and as a solubilization agent for the zinc and lead in the gas stream. Stirrers 13 are operated at high speed to generate a metal shower or curtain within the condenser 12, the sprayed metal having a high surface area and promoting solubilization of zinc and lead as well as the cooling to bring about condensation. A line 14, supplied by a flow-splitting valve 14' can deliver a portion of the high carbon monoxide gases from line 25 to the gas stream as it enters the condenser 12.

Downstream of the condenser 12 is a cooler 15 which can supply molten lead to the condenser 12 and from which molten zinc can be recovered at 16. The melt from the condenser 12 can be withdrawn by a pump 12' and supplied to the cooler 15. Cooling can be effected in the later by a heat exchanger 15' immersed in the liquid and supplied by a cooling fluid. Line 16 is intended to represent a lock chamber or gate through which the zinc is discharged.

In the gas-flow direction, downstream of the condenser 12 there is provided a scrubber 18 which is connected to the condenser 12 by a conduit 17. The scrubber removes particles from the gas, namely, suspended matter, the gas then being conducted to a dropout separator 19 before passing into a scrubber 20. Carbon dioxide recovery is effected in a regenerator 21, the carbon dioxide being recovered at 22. Scrubbing liquid is recirculated by a pump 23' from a reservoir 23" to the tower 20 via line 23 and carbon dioxide laden scrubbing liquid is withdrawn by the pump 21' and delivered to the regenerator 21 via the line 21". The regenerator can have a heating unit 21a operated by a circulated energy source. Line 26 represents an excess carbon monoxide outlet and it is preferred to burn this excess carbon monoxide and use it to provide a heating fluid for the preheater 9. A gas cooler is provided at 24 for removal of water vapor from the high carbon monoxide gas. This cooler can be cooled by water.

Oxidic zinc ore and coke are supplied by metering and weighing belt conveyors 3 and 4 from supply bins 1 and 2 to the mixer 5, from which a mixture is fed in conduit 6 to the combustion path (tube) 7 after high-oxygen gas from conduit 8 and, if desired, high-carbon monoxide gas recycled through the preheater 9 and conduit 10, have been admixed so that solids and gas have been thoroughly mixed.

A suspension consisting mainly of molten particles and gas is fed from the combustion chamber 7 to the cyclone chamber 27. The molten phase is discharged through the tap hole provided in the wall of the cyclone chamber and through the conduit 11. The gas stream enters the condenser 12, which is supplied with molten lead and in which stirrers 13 are operated to produce a metal shower. In one embodiment of the invention, recycled high-carbon monoxide gas conducted in conduit 14 may be admixed to the gas stream immediately before it enters the condenser 12.

Molten metal is continuously conducted from the condenser 12 through the cooler 15, in which zinc is separated and from which the separated zinc is removed through a lock chamber and conduit 16.

The exhaust gas from the condenser 12 flows through a conduit 17 into a scrubber 18, in which suspended matter which contains zinc and lead is separated. The exhaust gas then enters the drop separator 19 and finally the scrubber 20 for removing carbon dioxide. The carbon dioxide-laden scrubbing liquid is freed from the carbon dioxide in a regenerator 21, from which carbon dioxide is conducted in the conduit 22, e.g., to a bottling plant. The regenerated scrubbing liquid is recycled to the scrubber 20 in the conduit 23.

The high-carbon monoxide gas which has been freed from carbon dioxide is treated in the gas cooler 24 to remove water vapor and is conducted in the conduit 25 selectively to conduit 10 and/or conduit 14. A surplus partial stream may be branched off in conduit 26 and may be burned and then used to heat the preheater 9.

SPECIFIC EXAMPLES

EXAMPLE 1

Zinc was volatilized in a cyclone chamber 27, which was 900 mm in diameter and had a length of 990 mm, and in a preceding combustion path 7 having a length of 1000 mm and a cross-sectional area of 225×410 mm.

The combustion path 7 was supplied with zinc oxide concentrate containing 66% by weight Zn and 1.3% by weight Pb, at a rate of 3330 kg/h; coke which contained 83.5% by weight C and 2.5% by weight hydrogen, at a rate of 1220 kg/h; and lime at a rate of 1130 kg/h.

The solid charge materials had been intimately mixed before to form a mixture having a median particle diameter of 60 microns.

Oxygen-containing gas containing 80% by vol. $O_2$ and 20% by volume nitrogen and supplied via conduit 8 at a rate of 1950 m$^3$/h (STP) and recycled gas containing 35% by vol. CO, 0.05% by vol. $CO_2$, 7.2% by vol. $H_2$, 0.01% by vol. $H_2O$, balance $N_2$ and supplied via conduit 10 at a temperature of 400° C. and at a rate of 3000 m$^3$/h (STP) were additionally admixed.

The resulting reaction temperature in the cyclone chamber was 1500° C. The gases leaving the cyclone chamber 27 at a rate of 6400 m$^3$/h (STP) had the following composition in % by volume:
 11.8 Zn
 20.1 CO
 26.1 $CO_2$
 4.1 $H_2$
 4.6 $H_2O$
 Balance $N_2$ These gases were at a temperature of 1500° C.

Molten material consisting mainly of slag was discharged from cyclone chamber 27 in conduit 11 to a settling hearth at a rate of 1570 kg/h.

The gases at a temperature of 1500° C. then entered the condenser 12, in which they were treated with a shower of molten metal, which was at a temperature of 440° C. and contained 98% by weight of metallic lead and 2% by weight of metallic zinc. The molten metal leaving the condenser 12 and entering the cooler 15 was at a temperature of about 550° C. The zinc content had increased to 2.26% by weight.

Gas having the following composition in % by volume
 22.8 CO
 29.6 $CO_2$
 4.7 $H_2$
 5.3 $H_2O$
 Balance nitrogen
was discharged into the scrubber 18 at a rate of 5640 m$^3$/h (STP) via conduit 17.

The gas entered at a temperature of 450° C. and was cooled to 40° C. by being trickled with water at a rate of 35 m$^3$/h. Suspended matter which contained zinc and lead was separated at a rate of 225 kg/h.

By the scrubbing with water, the gas rate had been increased to 5960 m$^3$/h (STP). For a removal of carbon dioxide, the gas was fed to the scrubber 20 and was contacted therein with an aqueous solution of monoethanolamine to remove carbon dioxide down to a residual content of 0.05% by volume. Owing to the removal of carbon dioxide, the gas rate was decreased to 4290 m$^3$/h (STP). The gas then entered the gas cooler 24 in which the exhaust gas was cooled to 20° C. and most of its water content was removed.

Gas at a rate of 4090 m$^3$/h (STP) left the gas cooler. As set forth hereinbefore, a stream of 3000 m$^3$/h (STP) of that gas was fed in conduits 25 and 10 to the cyclone chamber 27. The remaining gas at a rate of 1090 m$^3$/h (STP) was burnt and then mainly utilized to preheat the main gas stream in the preheater 9.

EXAMPLE 2

The system consisting of the combustion path 7 and cyclone chamber 27 used also in Example 1 was fed through conduit 6 with concentrate containing 66% by weight of zinc and 1.3% by weight of Pb, at a rate of 3330 kg/h; coke containing 83.5% by weight C and 2.5% by weight $H_2$, at a rate of 1670 kg/h; and lime at a rate of 1130 kg/h.

The solid charge materials had been thoroughly mixed before. The mixture had a median particle diameter of 60 microns. Oxygen-containing gas which contained 50% by volume $O_2$, balance $N_2$, and was at a temperature of 20° C. was fed through conduit 8.

The cyclone chamber 27 was operated at 1500° C.

Molten material at a rate of 1650 kg/h was discharged from the cyclone chamber 27 through conduit 11 to a settling hearth.

At the same temperature, the exhaust gases at a rate of 5550 m$^3$/h (STP) left the cyclone chamber 27. They had the following composition in % by volume:
 13.5 Zn
 22.0 CO
 24.8 $CO_2$
 4.2 $H_2$
 4.2 $H_2O$
 Balance $N_2$ Recycled gas at a rate of 6340 m$^3$/h (STP) and at a temperature of 40° C. and having the following composition in % by volume:
 38.4 CO
 0.5 $CO_2$
 7.4 $H_2$
 0.1 $H_2O$
 Balance $N_2$
was admixed to the exhaust gases immediately before they entered the condenser 12.

As a result, the gas rate was increased to 11,890 m$^3$/h (STP). The mixed gases were at a lower temperature of 800° C. and had the following composition in % by volume:
 6.3 Zn
 30.7 CO
 11.6 $CO_2$
 5.9 $H_2$
 1.9 $H_2O$
 Balance $N_2$ The gases at the above-mentioned temperature were fed to the condenser 12, which was operated with molten metal, which was at a temperature of 440° C. and contained 2.02% by weight of zinc, balance lead. In the condenser 12 the gases were cooled to 450° C. and virtually all zinc and lead vapors were removed therefrom. The molten metal circulated through the cooler 15 had a temperature of 550° C. and a zinc content of 2.35% by weight (balance lead) when it entered the cooler. When the molten metal left the cooler 15, the temperature of the molten metal had been reduced to 440° C. and its zinc content had been decreased to 2.02% as a result of the separation of zinc. Dross at a rate of 320 kg/h became available in the condenser 12.

Gas leaving the condenser 12 at a rate of 11,130 m$^3$/h (STP) left the condenser 12 through conduit 17 and had the following composition in % by volume:
 32.8 CO
 12.4 $CO_2$ 6.3 H$_2$
2.1 H$_2$O
Balance N$_2$ In the water scrubber 18, this gas was contacted with water, which was pump-circulated at a rate of 35 m$^3$/h. As a result, the gas was cooled to 40° C. and suspended matter which contained zinc and lead was separated at a rate of 225 kg/h.

The exhaust gas rate was increased to 11,400 m$^3$/h (STP) by the absorption of moisture. The exhaust gas was then fed to the scrubber 20 for a removal of carbon dioxide. In the scrubber 20, the gas was scrubbed with an aqueous solution of monoethanolamine to remove CO$_2$ down to a residual content of about 0.05% by volume. At the resulting rate of 10,030 m$^3$/h (STP), the gas entered the gas cooler 24, in which the exhaust gas was cooled to 20° C. and most of its water vapor content was removed.

Gas at a rate of 9470 m$^3$/h (STP) left the gas cooler 24. Of this gas, as mentioned hereinbefore, a stream of 6340 m$^3$/h (STP) was recycled through conduits 25 and 14 to the process at a point which immediately preceded the condenser 12. The remaining gas was used as fuel gas for other purposes.

We claim:

1. A process for the production of zinc, comprising the steps of:
    (a) reacting a zinc-containing oxide metallurgical material, a carbonaceous substance, and a high-oxygen gas in a cyclone chamber having an axis oriented from the horizontal to an angle up to 15° with the horizontal, at a temperature above 1300° C., thereby evaporating zinc and producing an exhaust gas stream containing carbon monoxide and carbon dioxide, the vaporized zinc being entrained in said exhaust gas stream;
    (b) condensing zinc from said exhaust gas and discharging at least most of the condensed zinc from the process;
    (c) removing carbon dioxide from said exhaust gas after the condensation of the zinc therefrom, thereby producing a high carbon monoxide gas;
    (d) recycling most of said high carbon monoxide gas to at least one of steps (a) and (b).

2. The process defined in claim 1 wherein said material contains lead in addition to said zinc and the lead is at least partly volatilized along with the zinc and condensed therewith.

3. The process defined in claim 2 wherein volatilization of zinc is effected in said cyclone chamber in step (a) at a temperature above 1450° C.

4. The process defined in claim 3 wherein said zinc is condensed in step (b) by contacting the same with at least one liquid metal selected from the group which consists of lead and zinc.

5. The process defined in claim 4 wherein said high carbon monoxide gas is recycled to cool said exhaust gas to a about 800° C. before it is subjected to condensation in step (b).

6. The process defined in claim 1, further comprising the step of preheating said high carbon monoxide gas by indirect heat exchange during the recycling thereof in step (a).

7. The process as defined in claim 1, further comprising the step of controlling the residence time along said combustion path so that said first suspension reacts substantially to at least 80% of completion before said second suspension is introduced into said cyclone chamber from said combustion path.

8. The process defined in claim 1, further comprising the step of controlling the velocity at which said first suspension is introduced into said combustion path to prevent backfire.

9. The process defined in claim 1 wherein said material has a high lead content, said process further comprising the step of recovering molten lead from said cyclone chamber.

10. A method of operating a plant for the production of zinc, comprising the steps of:
    (a) reacting a zinc-containing oxide metallurgical material, a carbonaceous substance, and a high-oxygen gas in a cyclone chamber having a substantially horizontal axis at a temperature above 1300° C., thereby evaporating zinc and producing an exhaust gas stream containing carbon monoxide in said exhaust gas stream;
    (b) condensing zinc from said exhaust gas by treating said exhaust gas with molten zinc or lead in a condenser and discharging at least most of the condensed zinc from the process;
    (c) removing carbon dioxide from said exhaust gas after the condensation of the zinc therefrom by scrubbing said exhaust gas, thereby producing a high carbon monoxide gas;
    (d) recycling most of said high carbon monoxide gas to steps (a) and (b);
    (e) regenerating the scrubbing liquid used in step (d);
    (f) burning a minor part of said high carbon monoxide gas to produce heat for use in the process.

11. A process for the production of zinc, comprising the steps of:
    (a) reacting a zinc-containing oxide metallurgical material, a carbonaceous subtance, and a high-oxygen gas in a cyclone chamber having an axis including an angle of 0° to 15° with the horizontal, at a temperature above 1300° C., thereby evaporating zinc and producing an exhaust gas stream containing carbon monoxide and carbon dioxide, the vaporized zinc being entrained in said exhaust gas stream,
    said material, caid carbonaceous substance and said high-oxygen gas being mixed at a temperature below the reaction temperature of the mixture to form a first suspension, said first suspension being initially reacted along a combustion path ahead of said cyclone chamber at substantially right angles to the axis thereof to produce a second suspension which consists predominantly of molten particles in addition to gas, said second suspension being introduced into said cyclone chamber for further processing therein;
    (b) condensing zinc from said exhaust gas and discharging at least most of the condensed zinc from the process;
    (c) removing carbon dioxide from said exhaust gas after the condensation of the zinc therefrom, thereby producing a high carbon monoxide gas;
    (d) recycling most of said high carbon monoxide gas to steps (a) and (b); and
    (e) burning a minor part of said high carbon monoxide gas to produce heat for use in the process.

12. The process defined in claim 11 wherein said material contains lead in addition to said zinc and the lead is at least partly volatilized along with the zinc and condensed therewith.

13. The process defined in claim 12 wherein volatilization of zinc is effected in said cyclone chamber in step (a) at a temperature above 1450° C.

14. The process defined in claim 13 wherein said zinc is condensed in step (b) by contacting the same with at least one liquid metal selected from the group which consists of lead and zinc.

15. The process defined in claim 14 wherein said high carbon monoxide gas is recycled to cool said exhaust gas to about 800° C. before it is subjected to condensation in step (b).

16. The process defined in claim 11, further comprising the step of preheating said high carbon monoxide gas by indirect heat exchange during the recycling thereof in step (a).

17. The process defined in claim 11, further comprising the step of controlling the residence time along said combustion path so that said first suspension reacts substantially to at least 80% of completion before said second suspension is introduced into said cyclone chamber from said combustion path.

18. The process defined in claim 11, further comprising the step of controlling the velocity at which said first suspension is introduced into said combustion path to prevent backfire.

19. The process defined in claim 11 wherein said material has a high lead content, said process further comprising the step of recovering molten lead from said cyclone chamber.

* * * * *